(12) United States Patent
Schreck et al.

(10) Patent No.: US 8,614,933 B2
(45) Date of Patent: Dec. 24, 2013

(54) OPTICAL UNIT PROTECTION ON A THERMALLY-ASSISTED MAGNETIC RECORDING HEAD

(75) Inventors: Erhard Schreck, San Jose, CA (US); Xuhui Jin, San Jose, CA (US); Greg Lyon, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 195 days.

(21) Appl. No.: 12/930,867

(22) Filed: Jan. 19, 2011

(65) Prior Publication Data

US 2012/0182844 A1    Jul. 19, 2012

(51) Int. Cl.
   *G11B 11/00*    (2006.01)

(52) U.S. Cl.
   USPC ..................................... 369/13.33; 369/13.13

(58) Field of Classification Search
   USPC .......... 369/13.13, 13.33, 13.32, 13.02, 13.17, 369/112.09, 112.14, 112.21, 112.27, 300; 360/59; 385/129, 31, 88–94; 29/603.07–603.27; 250/201.3, 201.5
   See application file for complete search history.

(56) References Cited

U.S. PATENT DOCUMENTS

| 7,289,422 | B2 | 10/2007 | Rettner et al. |
| 7,791,839 | B2 | 9/2010 | Olson et al. |
| 2009/0225636 | A1* | 9/2009 | Hirano et al. ............... 369/13.24 |
| 2010/0202256 | A1 | 8/2010 | Ito et al. |
| 2010/0328807 | A1* | 12/2010 | Snyder et al. .................... 360/59 |
| 2011/0317527 | A1* | 12/2011 | Wang et al. ................ 369/13.02 |
| 2012/0139566 | A1* | 6/2012 | Shimazawa et al. ..... 324/750.01 |

* cited by examiner

*Primary Examiner* — Tan X Dinh

(74) *Attorney, Agent, or Firm* — Saile Ackerman LLC; Stephen B. Ackerman

(57) ABSTRACT

An optical laser-activated TAMR (Thermal Assisted Magnetic Recording) slider, when normally mounted on a flexure, has an optical laser as well as other elements of its optical system exposed and subject to damage by mechanical shocks. The stand-off protective device disclosed herein, formed separately and attached to the flexure, or formed as part of the flexure itself, can protect the optical elements of such a slider from these shocks, particularly from inadvertent contacts with adjacent sliders or mechanical limiters.

9 Claims, 3 Drawing Sheets

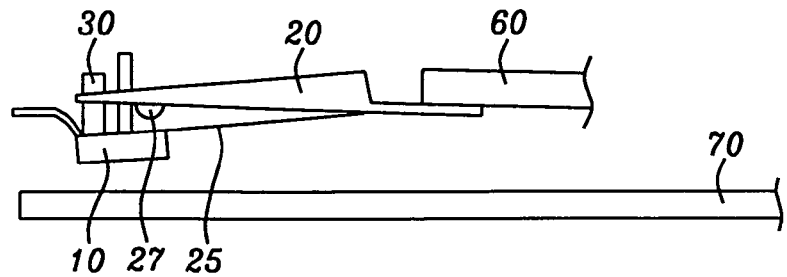
FIG. 1 – Prior Art
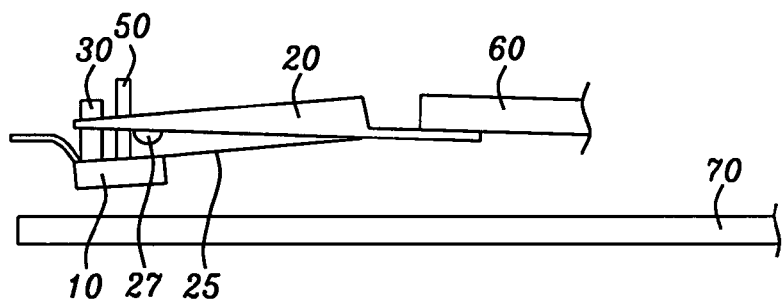
FIG. 2
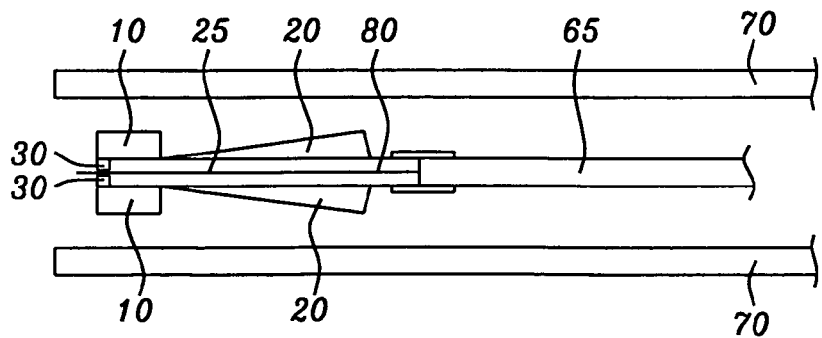
FIG. 3 – Prior Art

OPTICAL UNIT PROTECTION ON A THERMALLY-ASSISTED MAGNETIC RECORDING HEAD

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a shock-protected laser to transfer the required thermal energy from the read/write head to the media.

2. Description of the Related Art

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

The prior art forms of assisted recording methodologies being applied to the elimination of the above problem share a common feature: transferring energy into the magnetic recording system through the use of physical methods that are not directly related to the magnetic field produced by the write head. If an assisted recording scheme can produce a medium-property profile to enable low-field writing localized at the write field area, then even a weak write field can produce high data density recording because of the multiplicative effect of the spatial gradients of both the medium property profile and the write field. Many of these prior art assisted recording schemes involve deep sub-micron localized heating initiated by an optical beam.

The heating effect of TAMR works by raising the temperature of a small region of the magnetic medium to essentially its Curie temperature ($T_C$), at which temperature both its coercivity and anisotropy are significantly reduced and magnetic writing becomes easier to produce within that region when the medium cools down.

In the following, we will address our attention to a particular implementation of TAMR, namely the transfer of electromagnetic energy to a small, sub-micron sized region of a magnetic medium through interaction of the magnetic medium with the near field of an edge plasmon excited by an optical frequency laser ("optical laser" for short). The transferred electromagnetic energy then causes the temperature of the medium to increase locally.

The edge plasmon may be excited in a small conducting plasmon antenna (PA) or in a plasmon generator (PG), typically approximately 200 nm in width that is incorporated within the read/write head structure. The source of optical excitation can be a laser diode, contained within the read/write head structure, or a laser source that is external to the read/write head structure. The external laser excites the near-field source through free-space coupling, whereas a slider mounted laser may direct its beam of optical radiation at the antenna through a means of intermediate transfer such as an optical waveguide (WG). As a result of the WG, the optical mode of the incident radiation couples to a plasmon mode in the PA or PG, whereby the optical energy is converted into plasmon energy, This plasmon energy is then focused by the PA or PG onto the medium, at which point the heating occurs. When the heated spot on the medium is correctly aligned with the magnetic field produced by the write head pole, TAMR is achieved.

Typically in the TAMR assembly the laser unit and associated optical elements as well, are mounted directly on the slider and extend beyond the normal slider and HGA (head gimbals assembly) geometry. In this exposed position, the laser unit becomes prone to damage during shock events. The following prior art all show lasers that are exposed to such shock-induced damage because of their mounting.

Rettner et al. (U.S. Pat. No. 7,289,422) describe a slider mounted laser.

Ito et al. (US Publ. Pat. Appl. 2010/0202256) also shows a slider mounted laser.

Olson et al. (US Publ. Pat. Appl. 2008/0068748 teaches that a laser may be mounted on a head carrier.

SUMMARY OF THE INVENTION

It is an object of the present invention to provide a TAMR head structure in which thermal energy is provided to a magnetic medium by means an optical laser and associated optical equipment, in which the optical laser is protected from shock-induced damage.

It is a further object of the present invention to provide such a shock-protected laser wherein the shock-protecting device is either constructed out of the load beam material itself, or is implemented by the attachment of a separate element to the load beam.

These objects will be achieved by means of a shock-protecting element that is a metallic stand-off which is either formed out of the load beam material or attached separately to the load beam. The stand-off partially or entirely surrounds the laser in a manner that protects it from inadvertent contacts with adjacent equipment such as a mechanical limiter or an adjacent mounted slider.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 1 is a schematic drawing showing a prior-art head-gimbal assembly (HGA) including an arm, a flexure, a load-beam and a gimbal-mounted TAMR slider. The slider includes an unprotected laser.

FIG. 2 is a schematic drawing showing prior-art back-to-back gimbal-mounted sliders of the type shown in FIG. 1. Each slider has an unprotected laser extending in a manner that leaves it vulnerable to inadvertent contact with the other laser or with other portions of the adjacent apparatus in the event of a mechanical shock.

FIG. 3 is the schematic drawing of the HGA of FIG. 1, showing a stand-off element extending alongside the laser so as to protect the laser from contacts.

DESCRIPTION OF THE PREFERRED EMBODIMENTS

Figure 4:
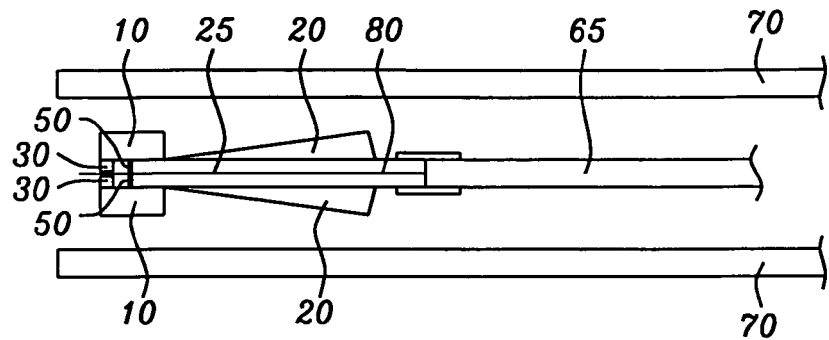
FIG. 4 is the schematic drawing of the back-to-back HGAs of FIG. 2 showing a stand-off element extending alongside each laser so as to protect the lasers from contact with each other or other portions of the adjacent apparatus.

Each of the preferred embodiments of this invention is a slider-mounted TAMR read/write head in which the necessary thermal energy for the TAMR is produced by optical laser-induced excitation of an electromagnetic near-field, such as that of a surface plasmon in a plasmon antenna or a plasmon generator. The laser activated TAMR slider is then mounted on a flexure to become part of the head-gimbals assembly (HGA) of a hard disk drive (HDD).

The invention is a stand-off protective device to protect the laser and other associated optical components, which would otherwise project in an exposed and unprotected fashion from the slider and through the flexure. In this unprotected state, there may be inadvertent contacts with neighboring sliders or other nearby mechanical parts (such as mechanical limiters) during mechanical shocks that the HDD may experience. The stand-off protective device may be a separate add-on element that is attached, by an adhesive such as epoxy, to the flexure holding the slider on the flexure surface opposite the surface holding the slider. The protective device will generally be formed of the same material as the flexure itself.

The stand-off protective device may be formed surrounding either or both of the sides of the projecting laser and, if deemed advisable, may also extend over and cover the top surface of the laser. Alternatively, in a separate embodiment, the stand-off protective device may be formed integral to the flexure itself, by cutting away a portion of the flexure and bending it in a direction away from the disk-facing flexure plane (eg., at 90° to the slider mounting surface) so that it partially (or entirely) surrounds the laser and, possibly, other exposed optical components as well. The opening in the flexure formed by cutting and bending away this flexure portion then allows passage of the laser. In all of the embodiments, the protective device is simple to form and does not substantially disrupt the typical fabrication processes involved in forming non-protected TAMR devices.

First Embodiment

Referring to schematic FIG. 1, there is shown a side view of a prior art head-gimbals assembly (HGA), which includes a load beam (20) with a slider (10) mounted on a flexure (25) beneath the load beam. A portion of the flexure on which the slider is mounted (the gimbal portion) can pivot about a "dimple" (27) that projects from the bottom of the load beam. The load beam is attached to an arm (60) that is activated by an electro-mechanical system (not shown) within the hard disk drive (HDD). The entire HGA structure is positioned above a rotatable hard disk (70). The slider includes a TAMR write head (not shown) that is energized by an optical laser (30). Although not shown in this illustration, the optical laser is generally associated with additional optical apparatus, such as a waveguide that directs its radiation to a plasmon antenna or a plasmon generator. In what follows, therefore, the protected schematic element (30) will be referred to as the laser, but it should be understood that other optical elements may also project from the slider and, if they project beyond the flexure and load beam, they will be assumed to also be represented by the element indicated as (30).

As is illustrated schematically, therefore, the laser projects above the slider and passes through an opening formed in the flexure and also through the load beam, so that the size and shape of the laser is accommodated. If left unprotected, this exposed position of the laser would allow it to be subject to damage from contact with adjacent equipment in the event the HDD apparatus was subject to a mechanical shock.

Referring next to schematic FIG. 2, there is shown the HGA of FIG. 1, which is identical in all respects to that in FIG. 1, except that a stand-off device (50) has been mounted on the upper surface of the flexure (25) where it projects beyond the laser (30) (and passes beyond the load beam as well) and partially or completely surrounds the projecting portion of the laser.

Referring now to schematic FIG. 3, there is shown a prior art arrangement wherein two back-to-back HGAs are capable of accessing two disks (70) as part of a multiple disk apparatus in a HDD. Each individual HGA, like the single unit of FIG. 1, but omitting some of the detail of FIG. 1, includes a load beam (20), a flexure (25) and a TAMR slider (10) mounted to the flexure (note, the flexure here is not shown separately from the load beam for simplicity). A laser (30) is shown projecting from each slider. The load beams are shown attached to a common arm (65) and a mechanical limiter (80), which is not always present, is positioned between the two flexures to prevent inadvertent contact between them.

Referring next to FIG. 4, there is shown schematically the arrangement of FIG. 3, which is in all ways identical to that arrangement except that the laser (30) projecting from the TAMR slider (10) is now partially surrounded by the protective stand-off element (50) of the present invention.

Figure 5:
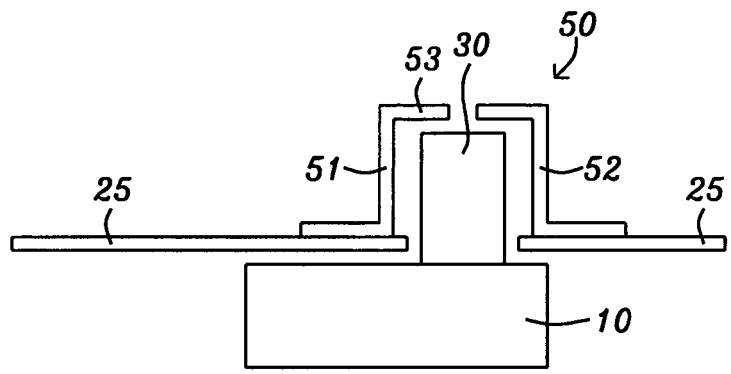
FIG. 5 is a schematic drawing showing an enlarged and more detailed illustration of the slider of FIG. 1 showing a first embodiment of the stand-off. The stand-off in this embodiment is separately mounted and surrounds the laser on two lateral sides and an upper surface and protects it from shock-caused contacts with mechanical parts or adjacent sliders.

Referring now to schematic FIG. 5, there is shown a first embodiment of the stand-off device (50) of FIG. 2. The stand-off device, here shown in cross-section, has two elements, (51) and (52), attached to the flexure (25), either by soldering or by an epoxy adhesive. The two elements, which may be separate pieces of metallic material, such as the material forming the flexure itself, offer protection to opposite lateral sides of the laser (30). The elements may be further shaped to form an upper surface (53) that also protects the top surface of the laser. The stand-off device may be formed as a box, that completely surrounds and encloses the laser, or the laser plus any additional optical equipment that extends beyond the load beam and would otherwise be exposed to contacts with adjacent equipment. In the event that the stand-off device is a complete enclosure, such as a cylinder or a rectangular box, the elements shown as (51) and (52) are understood to be cross-sectional slices through the enclosure and not separately mounted elements.

Alternatively to the pair of elements shown here, either one of the two elements may be used, such as (51) or (52) separately, to provide sufficient protection to the laser, depending upon the position of adjacent apparatus that could come in contact with the laser in case of a shock.

Second Embodiment

Figure 6:
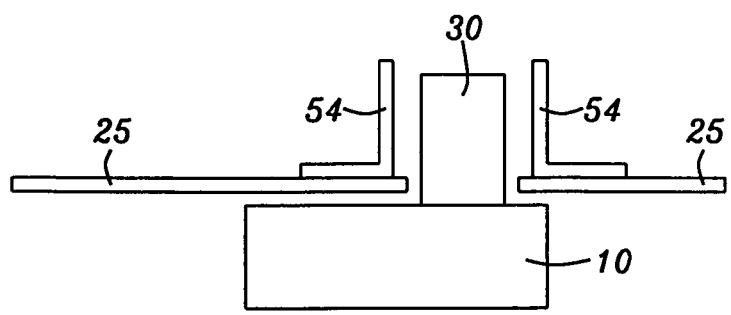
FIG. 6 is a schematic drawing showing an enlarged and more detailed illustration of the slider of FIG. 1 showing a second embodiment of the stand-off. In this embodiment, a pair of separately mounted stand-offs protects the laser on two lateral sides.

Referring now to schematic FIG. 6, there is shown a second embodiment that is in every respect the same as the first embodiment shown in FIG. 5, except that the stand-off elements (54) have not been shaped to provide an overhead protective surface for the laser (30). As in the first embodiment, either one or both of the stand-off elements can be fastened to the load beam and serve to protect the laser (30) from shocks. Also as described in the first embodiment, the stand-off can be a complete enclosure, shaped as a box of rectangular or cylindrical shape, in which case the elements (54) are cross-sections through the enclosure and not separately attached elements.

Third Embodiment

Figure 7:
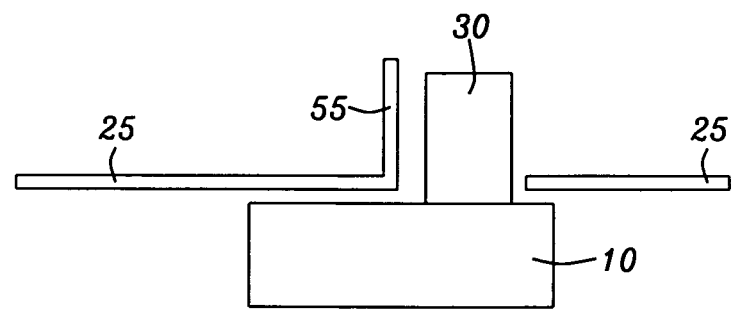
FIG. 7 is a schematic drawing showing an enlarged and more detailed illustration of the slider of FIG. 1 showing a third embodiment of the stand-off. In this embodiment a portion of the gimbal has been bent upward at an approximate 90° angle to serve as a protective stand-off for the laser.

Referring to schematic FIG. 7, there is shown a schematic side view of a third embodiment of the invention in which a protective stand-off element (55) is formed intrinsically from the material of load beam itself, rather than being a separate piece that is attached to the load beam as in the first two embodiments. In this embodiment, the stand-off protection can be formed by bending upward a piece of the flexure at a 90° angle (as shown). Typically, this piece of flexure material is a cut-out portion whose removal would normally create an opening through which the laser would project and which could also accommodate any additional components of the optical portion of the system. In this embodiment, however, this portion (55) of the flexure (25) remains part of the flexure and is used to form the stand-off element. Alternatively, a similar piece of the flexure from the opposite side of the laser (30) could be bent up. In this way, either one or two elements can be formed as a protective stand-off for the exposed laser.

Fourth Embodiment

Figure 8:
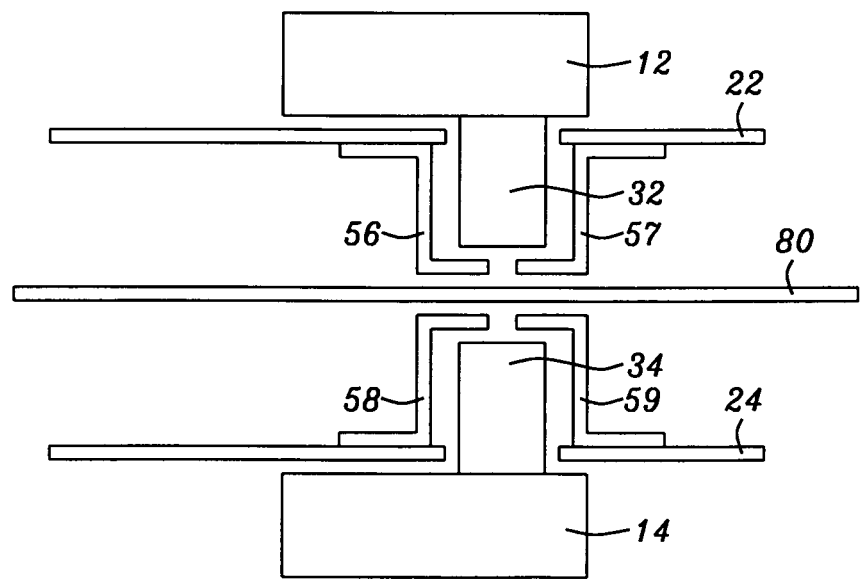
FIG. 8 is a schematic drawing of the two adjacent load beam mounted sliders of FIG. 4, in this illustration there being a mechanical limiter situated between them. A laser projects from each slider and is protected from both the mechanical limiter and the adjacent slider by separately mounted stand-offs.

Referring now to schematic FIG. 8, there is shown a fourth embodiment of the present invention in which the use of stand-off shock protection is shown in the context of the back-to-back HGAs of FIG. 4. FIG. 8 shows a pair of flexures (22) and (24) and a pair of mounted sliders (12) and (14), configured in a back-to-back configuration such as might be appropriate in a multi-disk HDD apparatus. The two mounted sliders are equipped with attached lasers (32), (34) and are separated by a mechanical limiter (80) whose role is to prevent unwanted interaction between the mounted sliders during disk drive operation. As can be seen, however, shocks could very easily induce contact between the lasers (32), (34) and the limiter (80), which is adjacent to both of them. In this case, separately attached stand-off elements (56), (57), (58) (59), each with an overhead protective piece, protect the lasers from such unintended contacts induced by shocks. It is understood that the stand-off elements produced by bending sections of the load beam, as in the third embodiment, could also be applied in this embodiment.

As is understood by a person skilled in the art, the preferred embodiments of the present invention are illustrative of the present invention rather than being limiting of the present invention. Revisions and modifications may be made to methods, processes, materials, structures, and dimensions through which is formed and used a TAMR write head with a shock-protected optical laser, while still providing such a TAMR write head, formed and used in accord with the present invention as defined by the appended claims.

What is claimed is:

1. A head-gimbals assembly (HGA) including a flexure mounted, shock-protected, laser-activated thermally assisted magnetic recording (TAMR) slider comprising:
    a flexure-mounted slider;
    a source of near-field electromagnetic energy configured to provide a thermal effect on a magnetic medium;
    a source of optical radiation configured to excite said near-field electromagnetic energy;
    additional components configured to transmit said optical radiation to said source of near-field electromagnetic energy;
    a stand-off protective element formed on said flexure and positioned adjacent to at least said source of optical radiation; wherein
    said stand-off protective element is formed of a piece of flexure material normally removed from said flexure to provide access to said source of optical radiation, but that is now left attached to said flexure and bent upward to form a protective shield; whereby
    said source of optical radiation and said additional components are protected from the adverse effects of mechanical shocks produced by contact with adjacent components.

2. The device of claim 1 wherein said source of optical radiation is an optical laser.

3. The device of claim 1 wherein said stand-off protective element protects the sides and top of said source of optical radiation.

4. The device of claim 1 wherein said stand-off protective element protects only one side of said source of optical radiation.

5. The device of claim 1 wherein said stand-off protective element forms a box completely surrounding said source of optical radiation.

6. The device of claim 1 wherein said stand-off protective element protects said source of optical radiation from contact with adjacent sliders and with adjacent mechanical limiters.

7. A method of forming a flexure-mounted, laser activated TAMR slider with a shock-protected laser, comprising:
    providing a flexure configured to mount a laser activated TAMR slider, said flexure including an opening through which said laser will project;
    forming a stand-off element on a surface of said flexure opposite the slider-mounting surface, wherein said stand-off element is positioned to one or another side of said opening or positioned on two opposite sides of said opening or positioned completely surrounding said opening; wherein said stand-off element is formed by bending a piece of flexure material normally removed to provide said opening, but that is now left attached to said flexure and bent upward to form a protective shield; and wherein said stand-off element extends beyond the projecting length of said laser, whereby said laser is protected from contact with surrounding apparatus as a result of mechanical shocks; then mounting said slider.

8. The method of claim 7 wherein said stand-off element is formed and positioned on opposite sides of said opening.

9. The method of claim 7 wherein said stand-off element is formed so that it completely surrounds said opening.

* * * * *